(12) United States Patent
Pinter (10) Patent No.: US 7,201,487 B2
(45) Date of Patent: Apr. 10, 2007

(54) ILLUMINATED SHELF

(76) Inventor: Matt Pinter, 1387 Spencer Woods, Muskegon, MI (US) 49445

(\*) Notice: Subject to any disclaimer, the term of this patent is extended or adjusted under 35 U.S.C. 154(b) by 0 days.

(21) Appl. No.: 11/117,209

(22) Filed: Apr. 28, 2005

(65) Prior Publication Data

US 2005/0185395 A1   Aug. 25, 2005

Related U.S. Application Data

(63) Continuation of application No. 10/674,765, filed on Sep. 30, 2005, now abandoned.

(60) Provisional application No. 60/414,710, filed on Sep. 30, 2002.

(51) Int. Cl.
*F21V 7/04* (2006.01)

(52) U.S. Cl. ............... 362/92; 362/133; 362/602; 362/632

(58) Field of Classification Search ............ 362/92, 362/600, 133, 602, 632
See application file for complete search history.

(56) References Cited

U.S. PATENT DOCUMENTS

| | | | | |
|---|---|---|---|---|
| 5,287,252 A | * | 2/1994 | Caruso | 362/92 |
| 6,210,013 B1 | * | 4/2001 | Bousfield | 362/92 |
| 6,227,636 B1 | * | 5/2001 | Lye et al. | 312/408 |
| 6,755,547 B2 | | 6/2004 | Parker | 362/31 |
| 2004/0264160 A1 | | 12/2004 | Bienick | |

\* cited by examiner

*Primary Examiner*—Sandra O'Shea
*Assistant Examiner*—Anabel Ton
(74) *Attorney, Agent, or Firm*—Van Dyke, Gardner, Linn & Burkhart, LLP

(57) ABSTRACT

A shelf assembly includes a panel having an edge and two opposed spaced apart sides extending from the edge. A light source positioned at or adjacent the edge of the panel, which selectively generates light and directs the light in an initial direction into the panel. In addition, the panel is adapted to redirect the light from the initial direction to an illumination direction through at least one of the sides of the panel.

21 Claims, 10 Drawing Sheets

ILLUMINATED SHELF

This application is a continuation application of U.S. patent application Ser. No. 10/674,765, filed Sep. 30, 2005 now abandoned, entitled ILLUMINATED SHELF, which claims priority from provisional application entitled ILLUMINATED SHELF, Ser. No. 60/414,710, filed Sep. 30, 2002, which are incorporated herein by reference in their entireties.

TECHNICAL FIELD AND BACKGROUND OF THE INVENTION

The present invention generally relates to an illuminated shelf and, more particularly, to an illuminated shelf that is particularly useful as a refrigerator shelf.

Currently, refrigerators include one or more incandescent light sources that are positioned in the compartment of the refrigerator for illuminating products supported on the shelves. However, incandescent light sources generate a significant amount of heat and, further, consume a considerably amount of space in the compartment of the refrigerator. In addition, due to the geometric constraints in the compartment, the compartment may have areas where the light does not reach, therefore, creating spaces where food can remain undetected.

Consequently, there is a need for a lighting system that provides better illumination in the compartment of a refrigerator and, further, in a manner that consumes less space than heretofore known. In addition, the lighting system should generate less heat than conventional non-incandescent lighting system.

SUMMARY OF THE INVENTION

Accordingly, the present invention provides an illuminated shelf that illuminates the refrigeration compartment of a refrigerator in a manner to minimize blind spots or dark spots in the refrigeration compartment and, further, in a manner that requires less space and also generates less heat.

Accordingly, the present invention provides a panel having an edge and two opposed spaced apart sides extending from said edge. A light source is positioned at the edge of the panel and selectively generates light and directs the light in an initial direction into the panel through the edge of the panel. The panel is adapted to redirect the light from the initial direction in a direction through at least the one of the opposed sides of the panel.

In one aspect, the light source comprises a light emitting diode.

In other aspects, the panel includes at least one reflective surface for redirecting the light from the initial direction to the illumination direction. Preferably, the panel includes a plurality of the reflective surfaces. For example, the reflective surfaces may be formed by prismatic shapes formed at one of the opposed sides of the panel. The prismatic shapes may comprise prismatic indents that extend into the panel. Alternately, the prismatic shapes may comprise prismatic projections that project from one of the opposed sides of the panel.

According to other aspects, the panel may have a plurality of light sources associated with it, with one or more light sources positioned at two or more edges of the panel so that light is directed into the panel from more than one edge.

From the foregoing, it can be appreciated that the illuminated shelf of the present invention provides for a more compact assembly and, further, can create light across the shelf with minimal dark spots or areas all in a manner that produces less heat than conventional illuminated shelves.

These and other objects, advantages, purposes, and features of the invention will become more apparent from the study of the following description taken in conjunction with the drawings.

DETAILED DESCRIPTION OF THE DRAWINGS

DETAILED DESCRIPTION OF THE PREFERRED EMBODIMENTS

Referring to FIGS. 1A–1D, the numeral 10 generally designates an illuminated shelf of the present invention. As will be more fully described below, illuminated shelf 10 includes a panel 12 and one or more light sources 14, which are positioned to direct light into the panel through an edge of the panel, with the panel adapted to redirect the light in a new direction, for example, either through the upper surface or upper side of the panel or through the lower surface or lower side of the panel or both.

Figure 3:
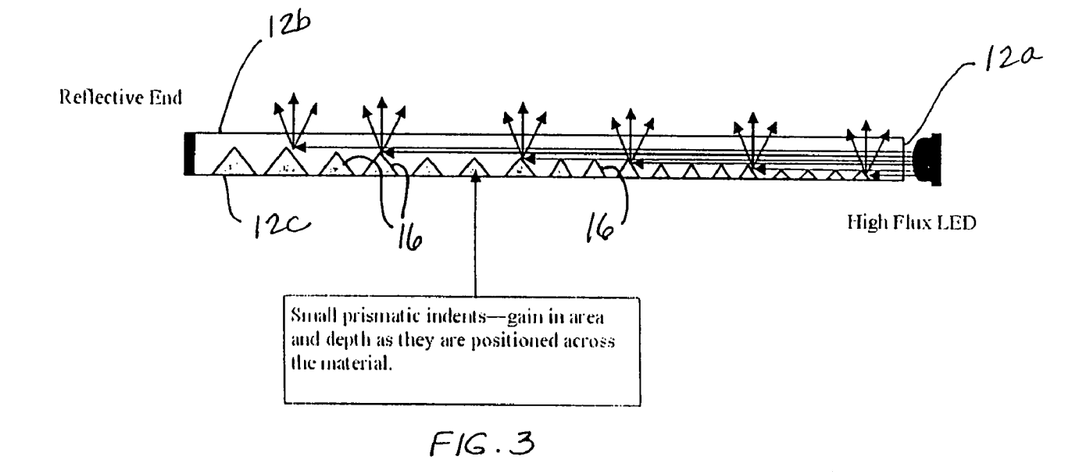
FIG. 3 is a cross-section view taken along line III—III of FIG. 2.

Referring to FIG. 3, shelf 10 is adapted to have or is formed with a plurality of reflective surfaces 16, which redirect the light from light source 14 in a direction that is angled with respect to the initial direction from which the light first enters the panel. For example, the reflective surfaces may direct light through upper surface 12*b* of panel 12 to create one or more lighted regions or areas above panel 12. Depending on the spacing of the respective reflective surfaces 16, the light areas or regions may overlap to provide a substantially continuous lighted area or surface over the panel.

Referring to FIG. 3, in the illustrated embodiment, reflective surfaces 16 are provided by plurality of prismatic shapes 18, such as indents formed in lower surface 12*c* of panel 12.

Figure 1A:
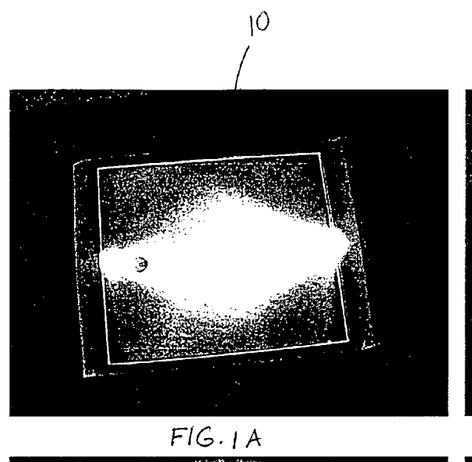
FIGS. 1A–1D are various views of an illuminated shelf of the present invention.
Figure 1B:
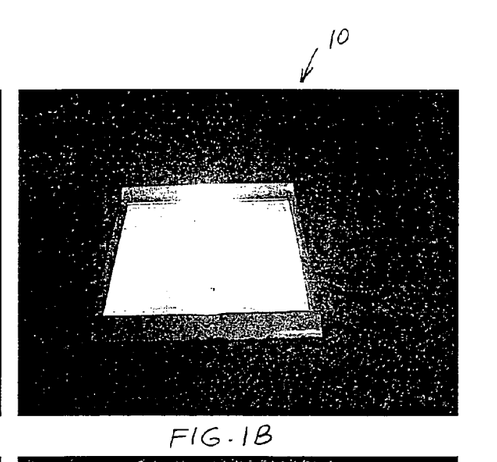
Figure 1C:
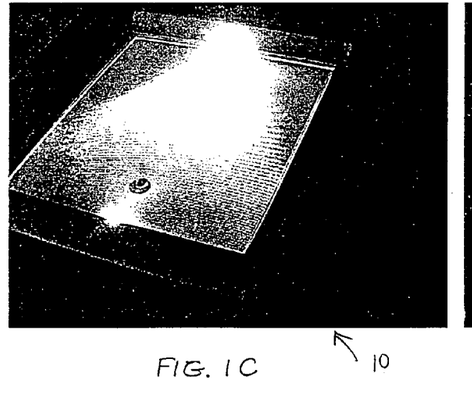
Figure 1D:
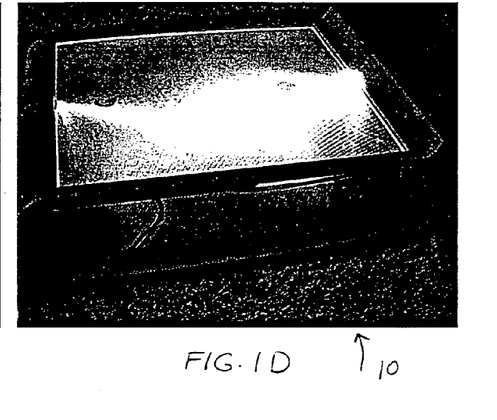
Figure 2:
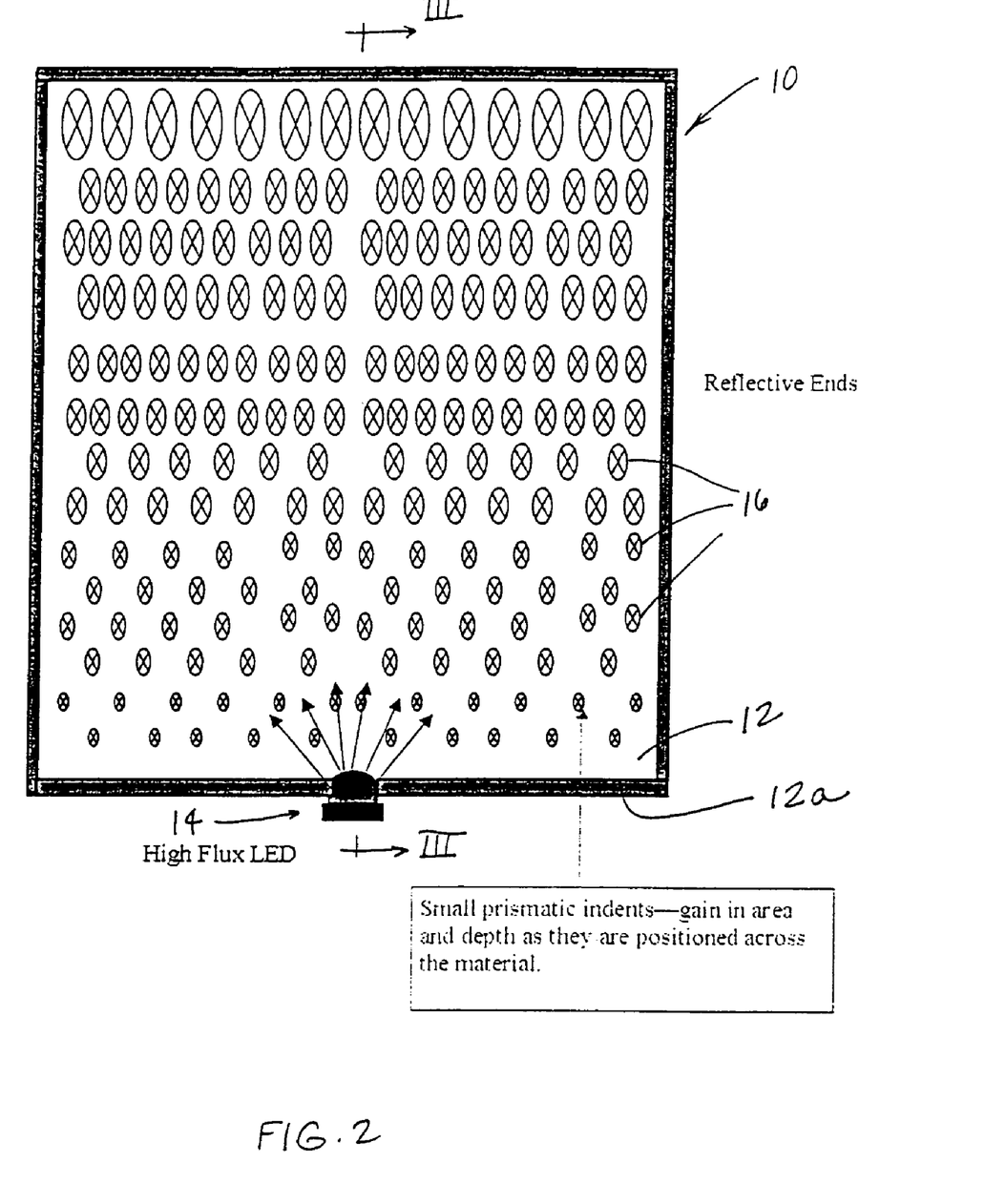
FIG. 2 is a schematic plan view of the illuminated shelf of the present invention.

In addition, in order to illuminate panel 12 across the width of panel 12, the height of the prismatic shapes 18 increase across the width of the panel. As best seen in FIG. 2, reflective surfaces 16 are spaced apart and arranged in an array such that each row initially has a set of reflective surfaces that are generally equally spaced and, further, such that each row offsets its reflective surfaces from the adjacent row. In this manner, some of the light is reflected at each row by the reflective surfaces but the remaining light is allowed to pass through further into the panel where each subsequent row reflects some of light and allows the remaining light to pass to the next row. Ideally, the last row of reflective surfaces will reflect the remaining light; however, it can be understood that some light may pass all the way through the panel to the opposed edge of the panel. Alternately, the edge of the panel may provide a reflective surface for at least some of the light. For example, where the edge of the panel is polished, the edge may reflect some of the light back into the panel. Similarly, a reflective coating may be applied to the edge so that all the light is reflected back into the panel.

Figure 4:
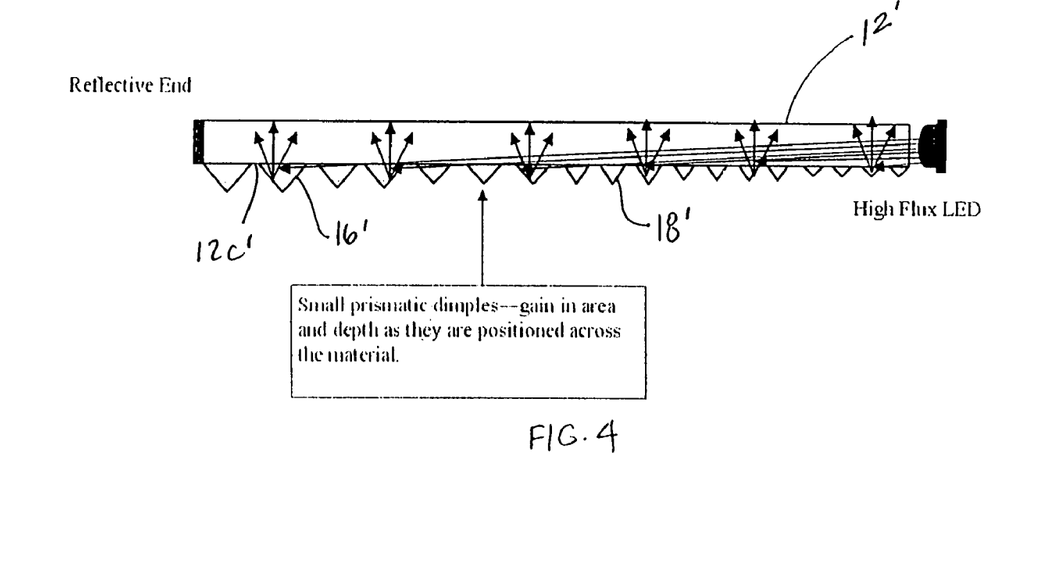
FIG. 4 is a similar view to FIG. 3 illustrating another embodiment of the shelf assembly of the present invention.

Referring to FIG. 4, the numeral 12' designates another embodiment of the panel of the present invention. In this embodiment, panel 12' may incorporate reflective surfaces 16' that are provided on lower surface 12c' of panel 12' and may be provided for example, by prismatic shapes 18' that project from the surface of panel 12' to form dimples. Similar to the previous embodiment, prismatic shapes 18' increase in height across the width of the panel and are arranged in rows so that the light will pass through panel, preferably, all the way through the panel so that the illuminated portion will extend across the width or depth of the panel.

Light source 14 may comprise an incandescent and/or non-incandescent light source, such as a light emitting diode (LED), a halogen light, a neon light, a fluorescent lamp, including a cold-cathode fluorescent lamp. Preferably, light source 14 comprises an LED and, more preferably, a high flux LED. In addition, the light source preferably generates a white light; however, it can be appreciated that other colors may be used. Since LEDs generate no ultraviolet or infrared light emission, LEDs do not generate the heat associated with incandescent light sources and are, therefore, especially suitable in environments where heat is undesirable. In addition, LEDs have a tunable color emission of white light. For example, the white light can be set to different color temperatures. In the present application, the light source preferably generates a non-yellow bright white light. It has been found that non-yellow bright white light is particularly appealing in certain environments because it generates a feeling of the presence of cleanliness. In addition, LEDs require low voltage and less current consumption that conventional lighting.

As is understood by those skilled in the light art, LED light is directional light; therefore, the light assembly itself does not require a reflector to direct the light in a desired direction (though a reflector may be provided). Another advantage is that LEDs have a long life and may last up to 100,000 hrs. Other advantages include the fact that LEDs can withstand high and low temperatures without any significant change in performance and, further, are extremely fast in reaction when turned on. For example, LEDs have approximately 100 nano-second reaction time and are, therefore, substantially instantaneous when power is applied.

Figure 5:
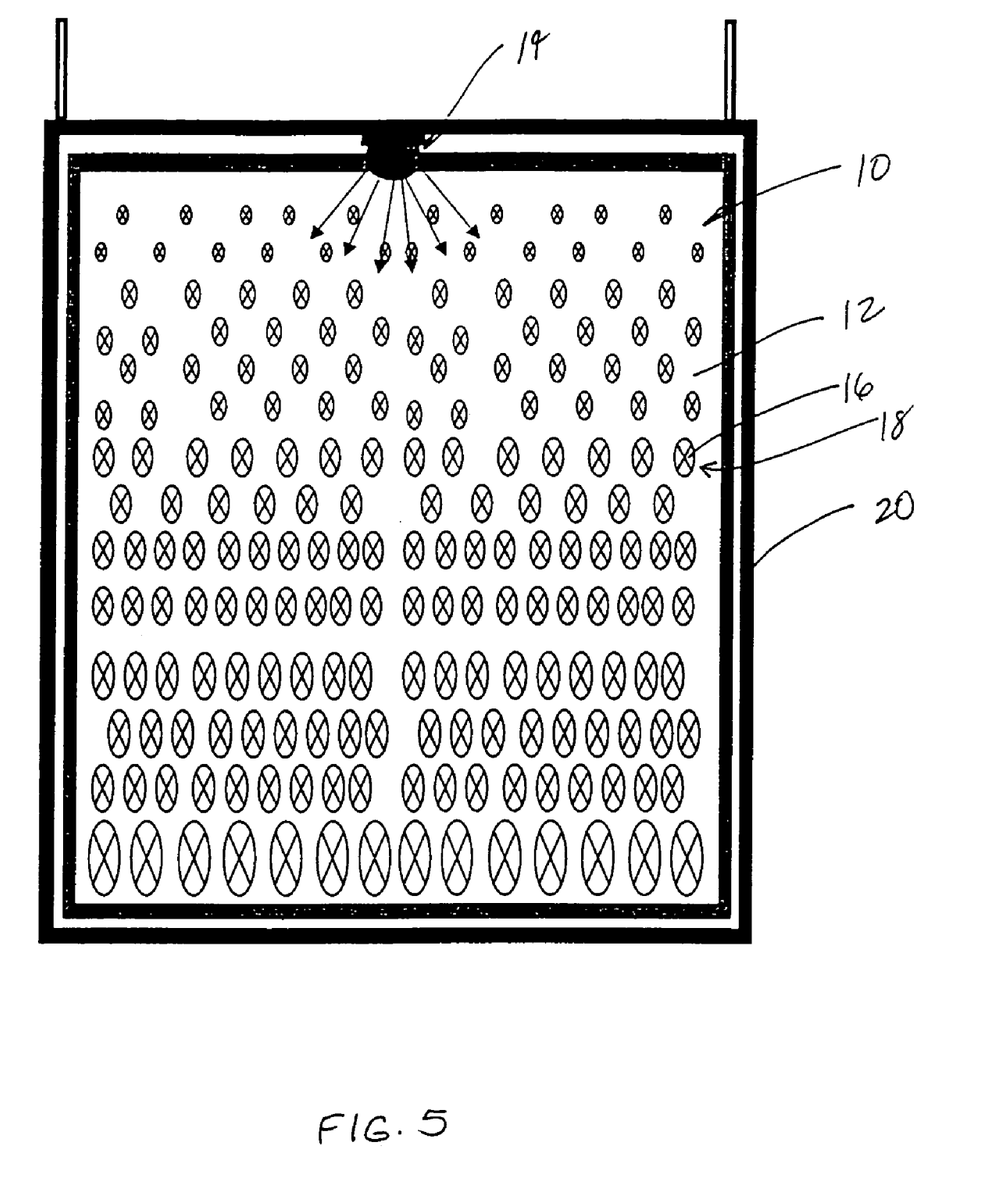
FIG. 5 is a top plan view of the illuminated shelf of the present invention incorporated into a shelf housing.

Referring to FIG. 5, light source 14 and panel 12 may be mounted in a frame 20, such as a shelf frame. Shelf frame 20 may comprise a frame formed from metal sides, which may provide a heat sink to dissipate any amount of energy generated by the light source. Furthermore, due to the longevity of light sources such as LED's, light source 14 may be molded or sealed into the plastic or shelf body, which is typically applied or molded onto the glass panel and to the metal frame. In this manner, light source 14 would be sealed from the elements of the refrigerator environment.

Panel 12 comprises a panel that may be formed from a plastic material or glass with the prismatic shapes formed during molding. For example, when molding panel 12 from glass, the glass panel may be molded using conventional techniques and, thereafter while the glass is still in its formable state, be impressed with the prismatic shapes.

Figure 6:
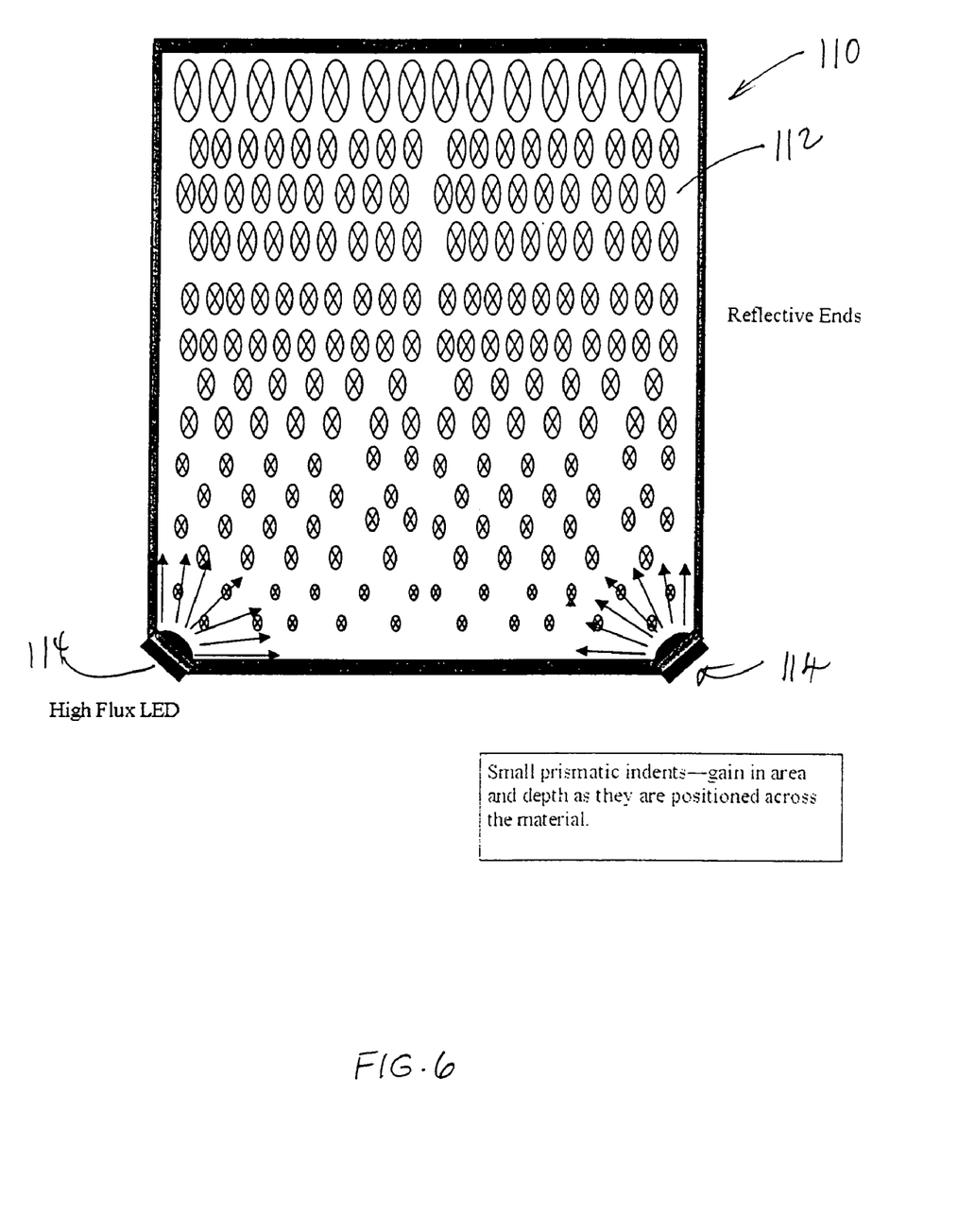
FIG. 6 is a top plan view of another embodiment of the illuminated shelf of the present invention.
Figure 7:
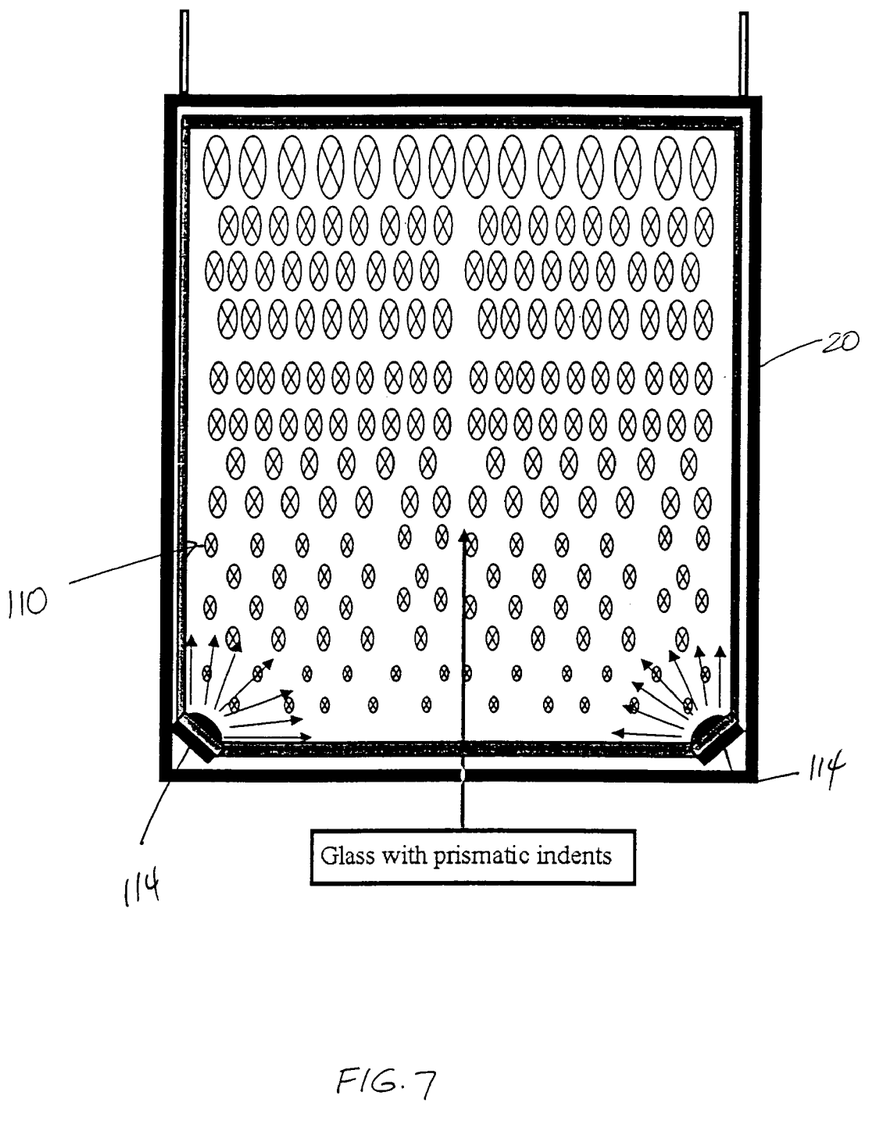
FIG. 7 is a top plan view of the illuminated shelf of FIG. 6 incorporated into a shelf housing.

Referring to FIG. 6, the numeral 110 generally designates yet another embodiment of the shelf of the present invention. Shelf 110 is of similar construction to shelf 10 and includes a panel 112 and a pair of light sources 114, which similarly direct light through a respective edge of panel 112. Reference is made to light source 14 for examples of suitable light sources. Panel 112 includes a plurality of reflective surfaces 116 similar to panel 12 and may comprise, for example, prismatic shapes, including prismatic projections or indents. In the illustrated embodiment, the edges are located at the corners of the respective panel. It should be understood, however, that light sources 114 may be located at other edges, including opposed edges, either front and back edges or left or right edges of the panel. Furthermore, a plurality of light sources may be provided at each respective edge of the panel and, further, may be similarly molded with the body of the shelf frame.

Figure 8:
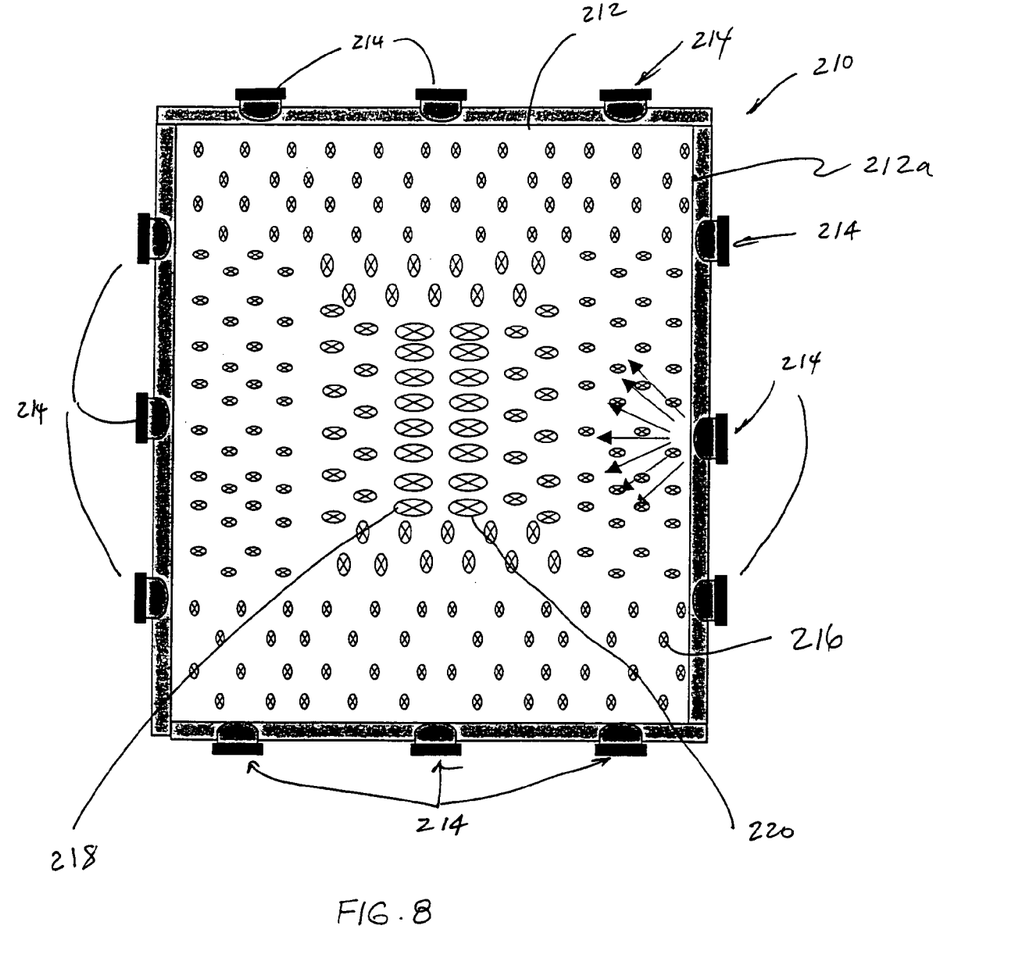
FIG. 8 is a top plan view of another embodiment of the illuminated shelf of the present invention.

Referring to FIG. 8, the numeral 210 generally designates another embodiment of the shelf of the present invention. Shelf 210 includes a panel 212 and a plurality of light sources 214, similar to the previous embodiment. In the illustrated embodiment, light sources 214 are located at each edge of panel 212 so that light is directed inward from all edges of panel 212. In addition, each edge 212a includes a plurality of light sources associated therewith; though, it should be understood that a single light source may be provided at each edge.

To redirect the light that is directed into panel 212, panel 212 includes a plurality of reflective surfaces 216, similar to the previous embodiments. In the illustrated embodiment, reflective surfaces 216 are similarly arranged in rows, but with the rows varying in density (i.e. the number of reflective surfaces) from the edge of the panel to the center of the panel, and with the rows at the center having a fewer number of reflective surfaces and, further, having, for example, the greatest height or depth. In this manner, when light enters one edge of the panel a portion of the light will be redirected by the first row and each subsequent row, which merge to the center, and so that approximately all the light will have been reflected by the time that light reaches the approximate center of the panel, though some light may still pass through the last innermost row of reflective surfaces associated with that particular edge. As can be appreciated from FIG. 8, the widths of the rows reduce as they approach the center of the panel, with the last rows associated with each edge merging to form two rows 218 and 220. It should be understood that the number of rows may be increased, as well as the number of reflective surfaces in each row. Further, the arrangement of the reflective surfaces may be adjusted to achieve another desired light pattern.

In operation, the glass or medium forming the panel is used to transmit or direct the light through the panel. When the light source is turned on and the light directed into the panel from one end of the panel toward the other end, light is turned by the reflective surfaces formed, for example, by small prisms, mirrors, or lines or by refraction by providing a change in the optical identity of the material forming the panel. The mirrors can be spherical or planar in shape. The preferred end result is to have total refraction or reflection where all the light is redirected through one side or both sides of the panel. In this manner, light is used to illuminate the area above or below the refrigerator shelf to illuminate the products supported on the respective shelf or on products supported below the shelf.

Alternately, a lenticular lens, a Fresnel lens, a 90° turning film or a beam splitter may be applied to the panel surface to redirect the light generated by the light source. Other types of lenses could be applied to the surface or provided inside the panel material. For example, a concave or convex lens can be applied to the material forming the panel. In addition, light can be reflected using different types of filters, including for example, longpass, shortpass, bandpass, interference, or dichroic filters.

It should be understood that the arrangement of the reflective surfaces may be adjusted as needed to achieve the desired lighting effect.

Figure 9A:
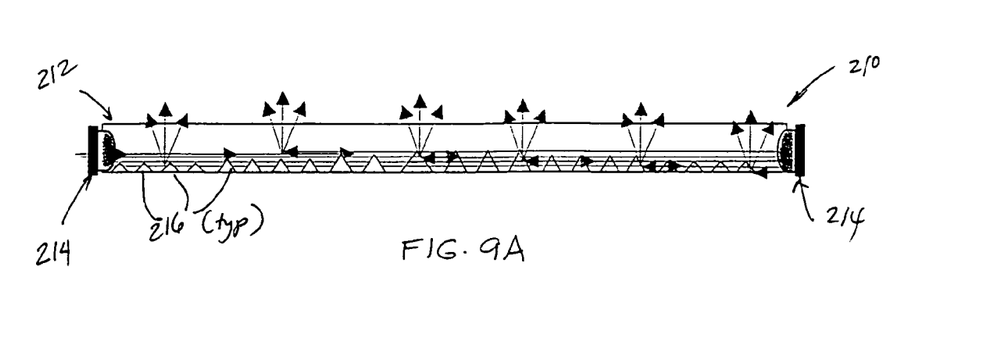
FIG. 9A is a cross-section view similar to FIG. 3 illustrating light sources on both sides of the panel of the shelf assembly an d the panel adapted to redirect the light through one side of the panel.
Figure 9B:
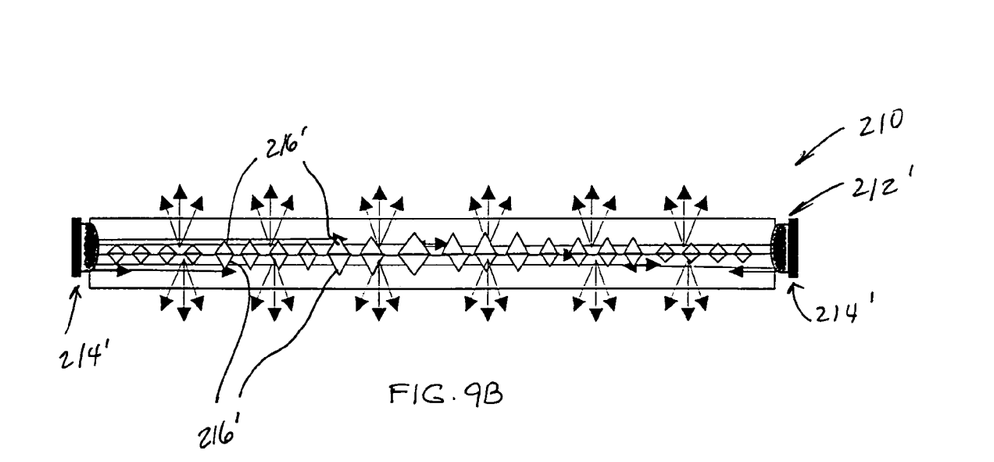
FIG. 9B is a similar cross-section to FIG. 9A illustrating the panel adapted to redirect light though both sides of the panel.

Referring to FIG. 9A, shelf 210 may include a panel 212 with reflective surfaces 216 that redirect light through only one side of the panel, such as through its upper side. Alternately, as shown in FIG. 9B, shelf 210 may include a panel 212' provided with reflective surfaces 216' that are arranged or configured to redirect light from light sources 214' through both sides of panel 212'. For example, reflective surfaces 216' may be molded in panel 212', such as described in reference to the previous embodiments, or may be formed or provided on a pair of panels, with the reflective surfaces provided on the inner facing sides of the two panels, which are then placed in a close proximity relationship and preferably in an abutting relationship. As previously noted, the reflective surfaces may be formed in or provided on the respective panels.

Therefore, it can be appreciated that light is diffused and directed above or below the shelf by small geometric shapes or bodies that are formed and/or provided in or on the material forming the panel. The selection of the placement and direction of the prismatic material will dictate the direction the light is sent. Furthermore, the panel may have additional diffusers to dissipate the light evenly across the shelf. It should be understood that the light may also be redirected by diffraction using, for example, diffractive bodies provided in the panel.

Although the various embodiments of the shelf of the present invention have been described in reference to one or more discrete light sources provided at a respective edge or edges of the shelf panel, it is also contemplated that light can be delivered to the edge of the panel by way of a light transmitting or conduiting member or device, such as a light pipe or light pipes or fiber-optic cable or cables. In this manner, the light pipe or cable would direct the light from the light source into the edge of the panel. Again, the light pipe or fiber-optic cable may be molded or otherwise attached to the panel to provide a modular panel. Alternately, the light transmitting member may be formed in the panel, as will be more fully described below.

Figure 10A:
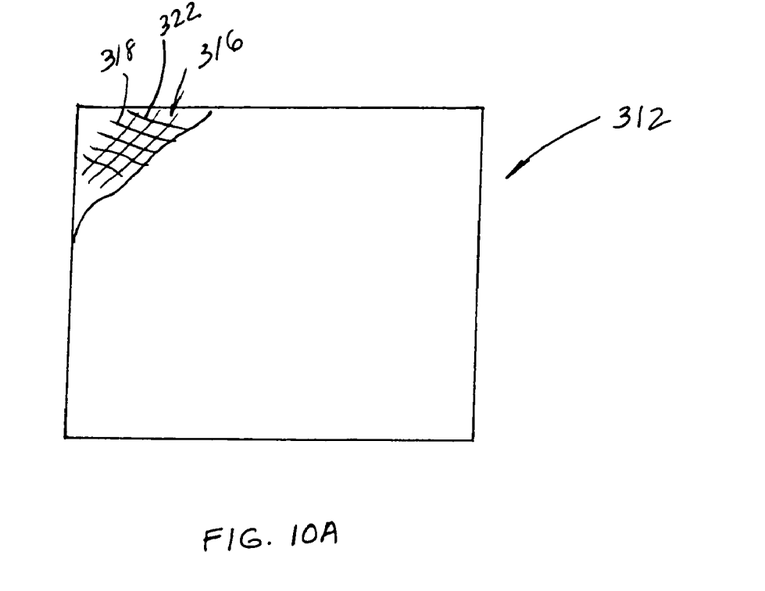
FIG. 10A is a plan view of yet another embodiment of the shelf panel of the present invention.

Referring to FIG. 10, panel 312 incorporates one or more light transmitting members 316 into the panel 312. Furthermore, light transmitting members 316 are configured and arranged so that they direct the light through the panel and, further, redirect the light in a direction angled to the initial direction of light so that light is directed outwardly through one or more of the opposed sides of the panel. In this application, one or more light sources 314 may be located at the edge of the panel to direct light into the panel and, more preferably, into the light transmitting member or members, which in turn redirect the light. Light transmitting members 316 may comprise fibers, fiber-optic cables or light pipes, for example, which are preferably integrally formed with panel 312, for example, by molding.

As noted above, light transmitting members 316 are adapted to redirect the light through one or more sides of the panel. For example, where fibers (or fiber-optic cables) are used, the fibers 318 may be woven into a fiber optic weave 322 (FIG. 10C) wherein the bends in the fibers create the locations where light is emitted through sides or circumferential surface of the fibers rather than at their ends. The tighter the weave the more diffused the light.

Figure 10B:
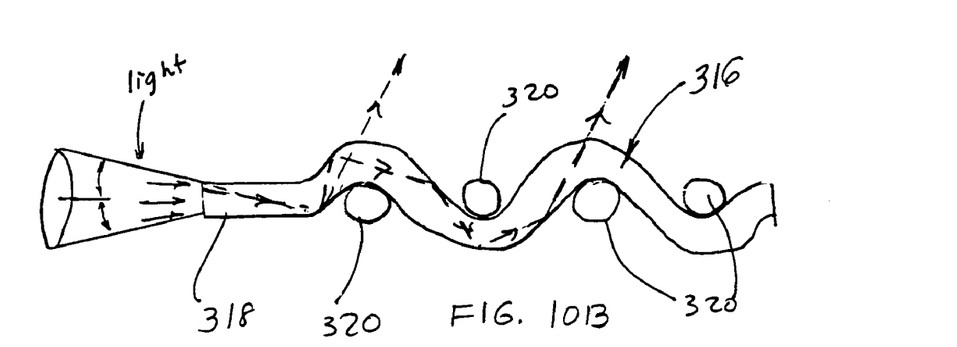
FIG. 10B is an enlarged cross-section of the panel of FIG. 10A.

Referring to FIG. 10B, light enters the panel through the highly polished ends of the fibers 318. The bends in the fiber cause the transmitted light to be emitted from the sides or circumferential surface of the fibers through the cladding of the fibers. The optical fibers are woven in to weave 322 using fill thread 320, which support the optical fibers in their bent configuration. Alternately or in addition, the cladding on the fiber-optic cable may be etched, notched or stamped to create locations where light may leak through the side of the cable. Preferably, though not necessarily, the fiber-optic cables are configured to emit light uniformly along the length of the panel.

Figure 10C:
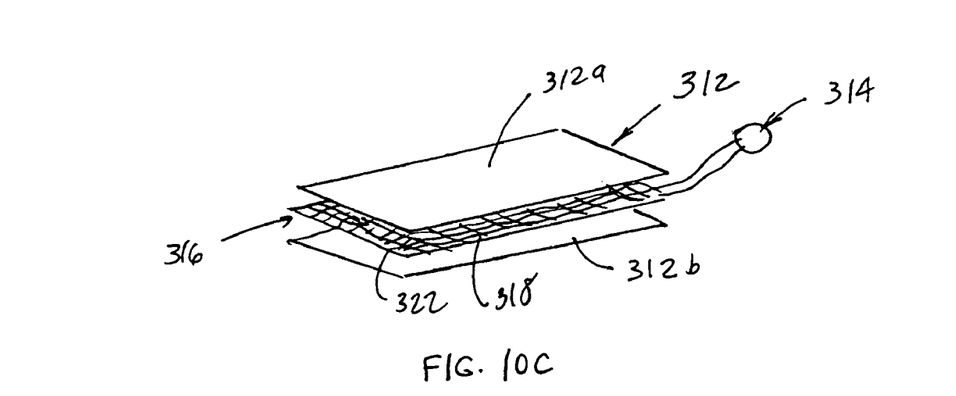
FIG. 10C is an exploded perspective view of the panel of FIG. 10A.

Optionally, panel 312 may be formed using single or multiple layers of fiber-optic weave. In addition, a reflector, such as a reflective layer or sheet positioned adjacent weave 322, may be used to direct light or reflect light in one direction. Panel 312 may also be formed from two panels 312a and 312b, with the fiber-optic weave sandwiched in between the two panels. For example, the sheets may be in a semi-molten state and then press molded with the fiber-optic weave positioned therebetween. Alternately, the fiber-optic weave may be molded with the panel. In addition, the panel may be formed from plastic so that the panel may be injection molded, with the fiber-optic weave placed in the mold cavity prior to injection molding. As best seen in FIG. 10C, the optical fibers 318 extend from the panel in cable form and are bundled, with their ends highly polished. These bundles can be then coupled or connected to light source 314, which may be remotely mounted or mounted adjacent one edge of panel 312.

Figure 11:
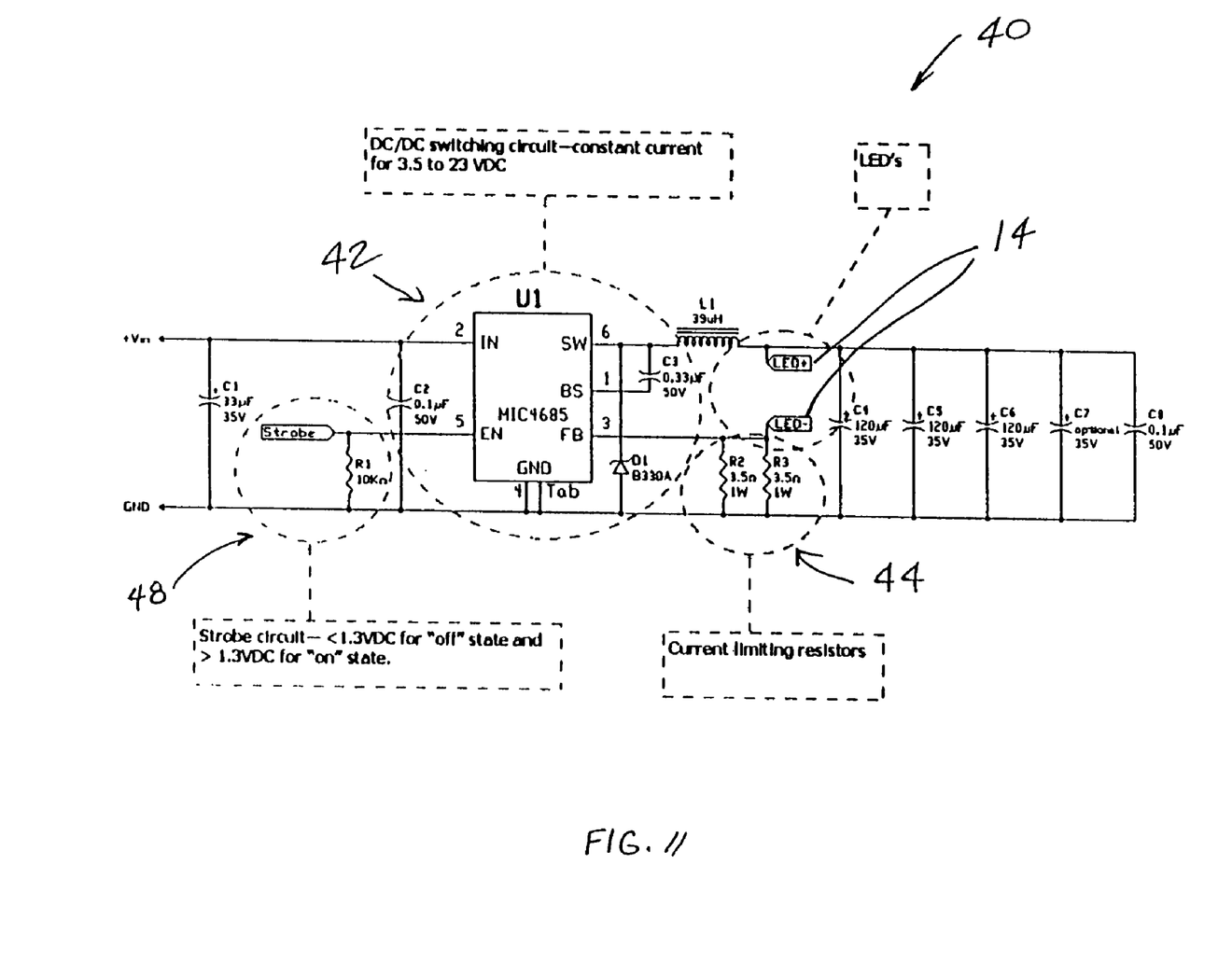
FIG. 11 is a schematic drawing of a driver circuit that may be used with the present invention.

Referring to FIG. 11, a driver circuit 40 suitable for use in the present invention includes a DC/DC switching circuit 42, which provides a constant current to the LED or LEDs 14. Preferably, circuit 40 includes one or more current limiting resistors 44, which provide an over-drive protection to the respective LED 14. In addition, circuit 40 may include a strobe input circuit 48 which provides input to the switching circuit 42. Each of the respective circuits are formed using conventional components, such as illustrated in FIG. 11. Optionally, the circuit may be mounted on a circuit board that is post-attached, for example, after molding the light source with the shelf frame body to form a shelf module and with the leads for the light source extending from the shelf module for coupling to the circuit. It should be understood that the circuit may include a socket or plug for connection to the electrical system of the refrigerator to ease installation and removal of the shelf. It can be appreciated that the circuit may be assembled using a variety of different components, as will be understood by those skilled in the art.

While several forms of the invention have been shown and described, other forms will now be apparent to those skilled in the art. For example, as described, the perimeter of the panel may be surrounded by light sources. In addition, the light sources may be mounted in a removable manner so that they may be replaced or repaired. Furthermore, suitable lights for any of the shelves include an incandescent and/or non-incandescent light source, such as a light emitting diode (LED), including a high flux LED, a halogen light, a neon light, and a fluorescent lamp, including a cold-cathode fluorescent lamp, such as described in reference to light source 14. In each of the embodiments, it should be understood that the panel may be formed from glass or plastic, including clear or tinted glass or plastic. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A shelf assembly comprising:
   a panel having an edge and two opposed spaced apart sides extending from said edge defining upper and lower sides, said upper side forming a support surface for supporting one or more objects on said shelf assembly;
   a light source, when actuated said light source generating light, said light projecting in an initial direction into said panel;
   a body mounted at said edge of said panel, said body including said light source;
   a refrigerator mounting bracket, said body mounting said refrigerator mounting bracket to said panel, and said refrigerator mounting bracket configured for mounting said panel in a refrigerator; and
   wherein said panel is adapted to redirect the light from said initial direction in an illumination direction through at least one of said sides of said panel to thereby illuminate the inside of a refrigerator when said light source is actuated and when said panel is mounted in the refrigerator.

2. The shelf assembly according to claim 1, wherein said light source comprises a light emitting diode.

3. The shelf assembly according to claim 1, wherein said panel includes at least one reflective surface for redirecting the light from said initial direction to said illumination direction.

4. The shelf assembly according to claim 1, wherein said light source comprises a plurality of light sources.

5. The shelf assembly according to claim 1, wherein said illumination direction is through said upper side for illuminating objects supported on said upper side.

6. The shelf assembly according to claim 1, wherein said light source directs light into said panel through said edge.

7. The shelf assembly according to claim 3, wherein said panel includes a plurality of said reflective surfaces.

8. The shelf assembly according to claim 3, wherein said panel includes a plurality of prismatic shapes formed at one of said sides of said panel for redirecting light from said initial direction.

9. The shelf assembly according to claim 8, wherein said prismatic shapes comprise prismatic indents extending into said panel.

10. The shelf assembly according to claim 8, wherein said prismatic shapes comprise prismatic projections from said panel.

11. The shelf assembly according to claim 8, wherein said prismatic shapes form a plurality of said reflective surfaces.

12. The shelf assembly according to claim 11, wherein said reflective surfaces are arranged in an array across said panel wherein said reflective surfaces redirect the light from said initial direction to said illumination direction across an area of one of said sides.

13. A shelf assembly comprising:
    a panel having an edge and two opposed spaced apart sides defining an upper side and a lower side of said panel, said upper side forming a support surface for supporting one or more objects on said shelf assembly;
    a plastic body mounted at said edge of said panel, said body configured to mount said shelf assembly in a refrigerator;
    a light source, said light source being located in said plastic body and generating light and directing said light in an initial direction into said panel; and
    said panel including a plurality of light reflecting surfaces, said light reflective surfaces redirecting the light from said initial direction to an illumination direction through at least one side of said upper side and said lower side of said panel, said light reflective surfaces arranged across at least a portion of said panel wherein a first group of said light reflective surfaces redirect a first portion of the light through a first portion of said at least one side, and subsequent groups of said light reflective surfaces redirecting other portions of the light through other portions of said at least one side.

14. The shelf assembly according to claim 13, wherein said light reflective surfaces are arranged in rows.

15. The shelf assembly according to claim 13, wherein said light reflective surfaces are arranged in an array.

16. The shelf assembly according to claim 13, wherein said light reflective surfaces are arranged to extend substantially across said panel wherein said reflective surfaces redirect light through said at least one side substantially across said panel.

17. The shelf assembly according to claim 13, wherein said reflective surfaces are formed by prismatic shapes formed at one of said sides of said panel.

18. A shelf assembly comprising:
    a panel having an edge and two opposed spaced apart sides defining an upper side and a lower side of said panel, said upper side forming a support surface for supporting one or more objects on said shelf assembly;
    a light source positioned at said edge, said light source generating light and directing said light in an initial direction into said panel through said edge of said panel; a refrigerator mounting bracket, said body mounting said refrigerator mounting bracket to said panel, said refrigerator mounting bracket to said panel, said refrigerator mounting bracket configured for mounting said panel in a refrigerator, and said light source located at or adjacent said mounting bracket for directing light into said panel;
    said panel including a plurality of light reflecting surfaces, said light reflective surfaces redirecting the light from said initial direction to an illumination direction through at least one side of said upper side and said lower side of said panel, said light reflective surfaces arranged across at least a portion of said panel wherein a first group of said light reflective surfaces redirect a first portion of the light through a first portion of said at least one side, and subsequent groups of said light reflective surfaces redirecting other portions of the light through other portions of said at least one side;
    wherein said light reflective surfaces are arranged in rows; and
    wherein each of said rows includes at least one respective light reflective surface, each of said rows offsetting said respective light reflective surface from a respective light reflective surface of an adjacent row.

19. The shelf assembly according to claim 18, further comprising a plastic body mounted to said panel at said edge, said light source located in said plastic body for directing light to said panel from said plastic body.

20. The shelf assembly according to claim 17, wherein said prismatic shapes comprise prismatic indents extending into said panel.

21. A shelf assembly comprising:
- a panel having an edge and two opposed spaced apart sides defining an upper side and a lower side of said panel, said upper side forming a support surface for supporting one or more objects on said shelf assembly;
- a light source positioned at said edge, said light source generating light and directing said light in an initial direction into said panel through said edge of said panel;
- said panel including a plurality of light reflective surfaces, said light reflecting surfaces redirecting the light from said initial direction to an illumination direction through at least one side chosen from said upper side and said lower side of said panel, said light reflective surfaces arranged across at least a portion of said panel wherein a first group of said light reflective surfaces redirect a first portion of the light through a first portion of said at least one side, and subsequent groups of said light reflective surfaces redirecting other portions of the light through other portions of said at least one side;
- a plastic body mounted to said panel at said edge, said light source located in said plastic body for directing light to said panel from said plastic body; and
- a bracket, said plastic body mounting said bracket to said panel.

* * * * *

UNITED STATES PATENT AND TRADEMARK OFFICE
CERTIFICATE OF CORRECTION

PATENT NO. : 7,201,487 B2
APPLICATION NO. : 11/117209
DATED : April 10, 2007
INVENTOR(S) : Matt Pinter Page 1 of 1

It is certified that error appears in the above-identified patent and that said Letters Patent is hereby corrected as shown below:

Column 2:
Line 28, "an d" should be --and--.

Column 8:
Line 15, Claim 13, "reflecting" should be --reflective--.
Line 46, Claim 18, Start new paragraph at --a refrigerator mounting bracket,--.
Lines 48-49, Claim 18, Delete "to said panel, said refrigerator mounting bracket".
Line 53, Claim 18, "reflecting" should be --reflective--.

Column 10:
Line 2, Claim 21, "reflecting" should be --reflective--.

Signed and Sealed this

Third Day of June, 2008

JON W. DUDAS
*Director of the United States Patent and Trademark Office*